US006895479B2

(12) United States Patent
Reimer et al.

(10) Patent No.: US 6,895,479 B2
(45) Date of Patent: May 17, 2005

(54) MULTICORE DSP DEVICE HAVING SHARED PROGRAM MEMORY WITH CONDITIONAL WRITE PROTECTION

(75) Inventors: Jay B. Reimer, Houston, TX (US); Tai H. Nguyen, Houston, TX (US); Yi Luo, Stafford, TX (US); Harland Glenn Hopkins, Missouri City, TX (US); Dan K. Bui, Sugarland, TX (US); Kevin A. McGonagle, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 293 days.

(21) Appl. No.: 10/008,515

(22) Filed: Nov. 8, 2001

(65) Prior Publication Data

US 2002/0059502 A1 May 16, 2002

Related U.S. Application Data

(60) Provisional application No. 60/248,966, filed on Nov. 15, 2000.

(51) Int. Cl.$^7$ ............................. G06F 12/14; G06F 12/00
(52) U.S. Cl. ....................... 711/152; 711/147; 711/150; 711/168; 712/35; 709/213
(58) Field of Search ................................. 711/152, 154, 711/147, 150, 168; 712/32–35; 709/248, 400, 213

(56) References Cited

U.S. PATENT DOCUMENTS

| | | | | |
|---|---|---|---|---|
| 5,872,993 | A | * | 2/1999 | Brown ........................ 712/35 |
| 6,253,293 | B1 | * | 6/2001 | Rao et al. ................... 711/147 |
| 6,327,648 | B1 | * | 12/2001 | Hedayat et al. ............... 712/35 |
| 6,430,664 | B1 | * | 8/2002 | Chauvel et al. ............. 711/168 |
| 6,526,462 | B1 | * | 2/2003 | Elabd ......................... 710/242 |
| 6,564,179 | B1 | * | 5/2003 | Belhaj ......................... 703/26 |

* cited by examiner

Primary Examiner—Mano Padmanabhan
Assistant Examiner—Jasmine Song
(74) Attorney, Agent, or Firm—Robert D. Marshall, Jr.; W. James Brady, III; Frederick J. Telecky, Jr.

(57) ABSTRACT

A multi-core digital signal processor is disclosed having a shared program memory with conditional write protection. In one embodiment, the digital signal processor includes a shared program memory, an emulation logic module, and multiple processor cores each coupled to the shared program memory by corresponding instruction buses. The emulation logic module preferably determines the operating modes of each of the processors, e.g., whether they are operating in a normal mode or an emulation mode. In the emulation mode, the emulation logic can alter the states of various processor hardware and the contents of various registers and memory. The instruction buses each include a read/write signal that, while their corresponding processor cores are in normal mode, is maintained in a read state. On the other hand, when the processor cores are in the emulation mode, the processor cores are allowed to determine the state of the instruction bus read/write signals. Each instruction bus read/write signal is preferably generated by a logic gate that prevents the processor core from affecting the read/write signal value in normal mode, but allows the processor core to determine the read/write signal value in emulation mode. In this manner, the logic gate prevents write operations to the shared program memory when the emulation logic de-asserts a signal indicative of emulation mode, and allows write operations to the shared program memory when the emulation logic asserts the signal indicative of emulation mode. The logic gate is preferably included in a bus interface module in each processor core.

22 Claims, 2 Drawing Sheets

MULTICORE DSP DEVICE HAVING SHARED PROGRAM MEMORY WITH CONDITIONAL WRITE PROTECTION

CROSS-REFERENCE TO RELATED APPLICATIONS

This application claims priority under 35 USC §119(e)(1) of Provisional Application No. 60/248, 966, filed Nov. 15, 2000.

STATEMENT REGARDING FEDERALLY SPONSORED RESEARCH OR DEVELOPMENT

Not applicable.

BACKGROUND OF THE INVENTION

The present invention generally relates to digital signal processors. More particularly, the invention relates to a program memory that is shared by multiple processor cores. Still more particularly, the present invention relates to a shared program memory that is conditionally write protected to prevent corruption of program code during normal operation.

Microprocessors generally include a variety of logic circuits fabricated on a single semiconductor chip. Such logic circuits typically include a processor core, memory, and numerous other support components. Some microprocessors, such as digital signal processors (DSPs) provided by Texas Instruments, may include multiple processor subsystems each having its own processor core. Each processor subsystem includes memory and other support components for the associated processor core.

It is generally desirable for microprocessors such as DSPs to be compact, consume very little power, and generate as little heat as possible. This is especially true for DSPs that reside in small, battery-powered devices such as cellular telephones, pagers, and the like. One method for reducing the size and power consumption of DSPs is to remove some of the redundancy of multi-core DSPs by allowing some support components to be shared by multiple cores.

A multi-core DSP having a shared program memory is described in a co-pending application Ser. No. 10/004,492 entitled "Shared Program Memory for use in Multicore DSP Devices" with inventors Kenneth C. Kelly et al., which is incorporated herein by reference. The shared program memory is a volatile memory device that is writeable to permit the software to be changed as desired. However, because the shared program memory is writeable, a processor core in a runaway condition could conceivably corrupt the software, thereby interfering with the operation of other processor cores.

It is therefore desirable to provide write protection of the shared program memory. On the other hand, write protecting the shared program memory would prevent the software from being loaded or changed. Furthermore, write protection would interfere with a desirable verification technique in which the processor itself writes test software to program memory. Accordingly, a multi-core processor is needed with a write-protected program memory that avoids these latter concerns.

BRIEF SUMMARY OF THE INVENTION

Accordingly, the present invention contemplates a multi-core digital signal processor having a shared program memory with conditional write protection. In one embodiment, the digital signal processor includes a shared program memory, an emulation logic module, and multiple processor cores each coupled to the shared program memory by corresponding instruction buses. The emulation logic module preferably determines the operating modes of each of the processors, e.g., whether they are operating in a normal mode or an emulation mode. In the emulation mode, the emulation logic can alter the states of various processor hardware and the contents of various registers and memory. The instruction buses each include a read/write signal that, while their corresponding processor cores are in normal mode, is maintained in a read state. On the other hand, when the processor cores are in the emulation mode, the processor cores are allowed to determine the state of the instruction bus read/write signals. Each instruction bus read/write signal is preferably generated by a logic gate that prevents the processor core from affecting the read/write signal value in normal mode, but allows the processor core to determine the read/write signal value in emulation mode. In this manner, the logic gate prevents write operations to the shared program memory when the emulation logic de-asserts a signal indicative of emulation mode, and allows write operations to the shared program memory when the emulation logic asserts the signal indicative of emulation mode. The logic gate is preferably included in a bus interface module in each processor core.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via other devices and connections.

DESCRIPTION OF THE PREFERRED EMBODIMENTS

The preferred embodiment of the present invention is discussed below in the context of a multi-core, fixed-point, digital signal processor (DSP) chip. This embodiment, however, is not intended to limit the scope of this disclosure to this context, rather, the preferred embodiment may have applicability to any multiple core DSP device that would benefit conditional write protection of a shared program memory.

Figure 1:
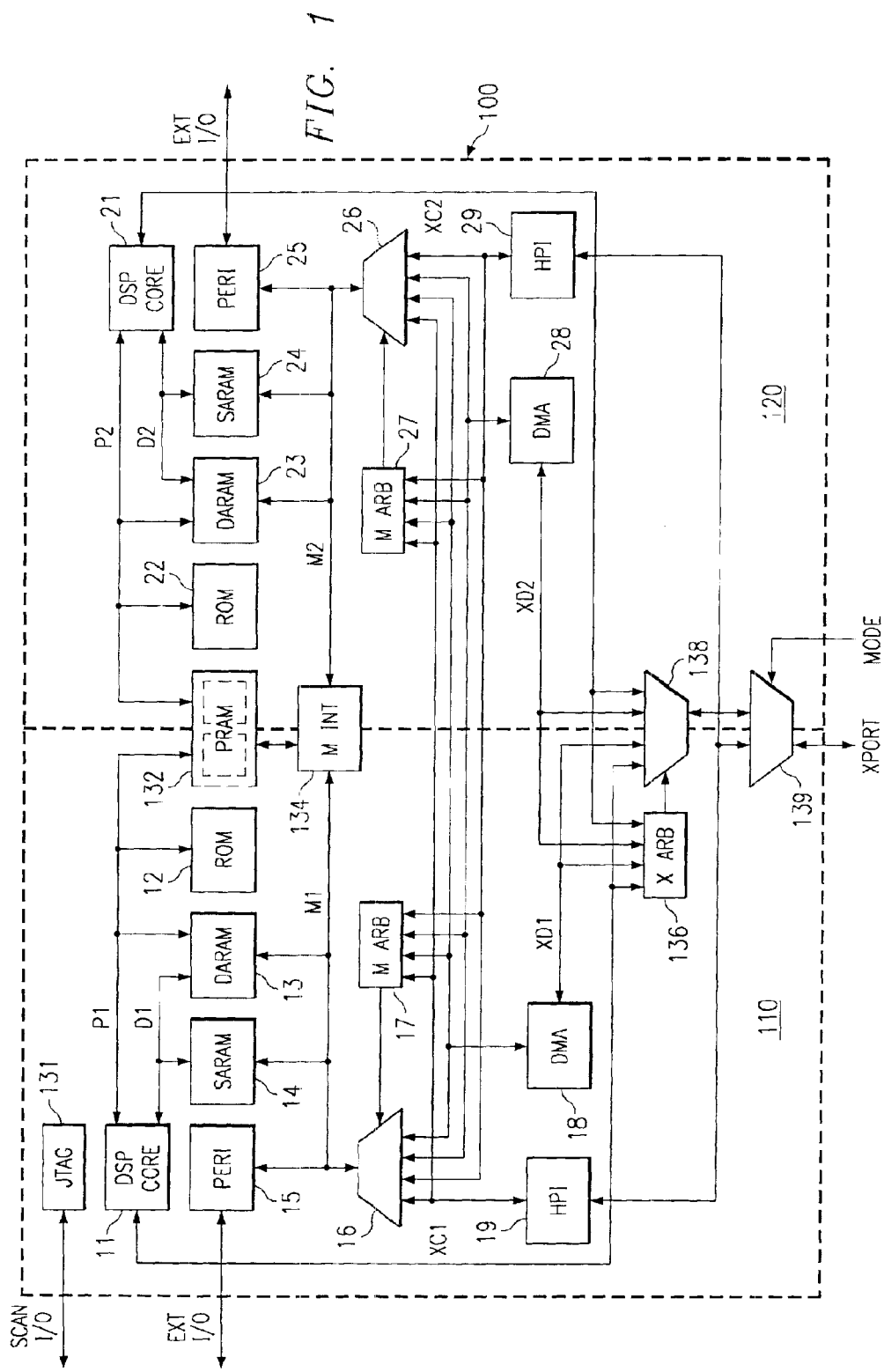
FIG. 1 shows a DSP device having a shared program memory.

Turning now to the FIG. 1 shows a DSP chip 100 that includes multiple DSP subsystems 110, 120, a shared program memory (PRAM) 132, a memory bus interface 134, an external I/O port (XPORT) arbiter 136, an XPORT multiplexer 138, and a host port interface (HPI) multiplexer 139. Each DSP subsystem 110, 120 (generally separated by the dashed line in FIG. 1) preferably includes a DSP core 11, 21, a read-only memory (ROM) 12, 22, a dual-access, random access memory (DARAM) 13, 23, a single-access, random access memory (SARAM) 14, 24, one or more peripheral devices 15, 25, an M-bus multiplexer 16, 26, an M-bus arbiter 17, 27, a DMA controller 18, 28, a host port interface (HPI) 19, 29, and other miscellaneous support circuitry. The subsystems 110, 120 each further include an instruction bus P1, P2, a data bus D1, D2, a memory bus M1, M2, a processor core external I/O bus XC1, XC2, and a DMA controller external I/O bus XD1, XD2.

The shared program memory (PRAM) 132 preferably is reserved for program instructions, and includes 16 blocks of dual-access RAM. Each block comprises 16 kilobytes of storage, although the block size and number of blocks can be varied as desired. Each DSP subsystem 110, 120 can fetch an instruction from any location in the PRAM 132 during each clock cycle. The processor cores 11, 21 concurrently fetch and execute distinct instructions from a single program stored in the PRAM 132. Although the DSP cores may execute the same software program, they do not necessarily execute the same instructions concurrently or necessarily follow the same branches in program flow. According to the preferred embodiment, a host processor (not shown) provides the software to the PRAM 132 via the XPORT, HPI 19,29 and memory buses M1, M2.

The memory bus interface 134 is coupled to PRAM 132 and to the memory buses M1, M2. The memory bus interface 134 provides a set of first-in, first-out (FIFO) buffers that the memory buses M1, M2 can write to and read from. Each FIFO buffer is one way, that is, written to by one memory bus and read by the other. This provides one method of inter-subsystem communication. The memory bus interface 134 also couples both memory buses M1, M2 to PRAM 132. The initial programming of the PRAM and updates of the PRAM are typically performed via the memory buses.

The XPORT arbiter 136 and XPORT multiplexer 138 are coupled to the processor cores 11, 21 and the DMA controllers 18, 28 in each of the subsystems via respective external I/O buses XC1, XC2, XD1, XD2. The processor cores and DMA controllers arbitrate for external access, and the arbiter 136 sets the multiplexer 138 in accordance with the arbitration results. The DSP 100 is provided in a semiconductor package that has multiple pins ("leads") to provide external connections for the chip. The package leads used by the XPORT for external access are preferably shared with the host port interface units 19, 29. Accordingly, the output from XPORT multiplexer 138 is coupled to the HPI multiplexer 139, as are the HPI units 19, 29. When the host processor asserts the MODE signal (which is the control signal for the HPI multiplexer 139) the XPORT pins are coupled to the HPI units 19, 29, and the host processor accesses the DSP device 100 as a memory-mapped device. When the host processor de-asserts the MODE signal, the XPORT leads are coupled to the XPORT multiplexer 138, and any external accesses are initiated by the cores 11, 21 or the DMA controllers 18, 28.

The processor cores 11, 21 preferably execute software instructions retrieved via corresponding instruction buses P1, P2 to operate on data retrieved via corresponding data buses D1, D2. Results are returned from the processor cores on the data buses. The processor cores typically include an optimized arithmetic logic unit (ALU) and a control unit. The control unit retrieves data and instructions and decodes the instructions, and the ALU operates on the data as specified by the instructions.

The ROMs 12, 22 are non-volatile memories coupled to the corresponding instruction buses P1, P2. The ROMs preferably store boot-up software for initializing the subsystems. The DARAMs 13, 23 preferably include four memory blocks, each of which support two memory accesses per clock cycle. The DARAMs 13, 23 are intended primarily for data storage, but may be used to store program instructions as well. Accordingly, they are coupled to both the corresponding instruction buses P1, P2 and to the corresponding data buses D1, D2. A register (not shown) in the DSP core 11, 21 determines whether the DARAM 13, 23 is mapped into program memory space or data memory space. The SARAMs 14, 24 preferably also include four memory blocks, each of which support one memory access per clock cycle. Each SARAM preferably is reserved for data storage, and accordingly is coupled to the corresponding data bus D1, D2.

Referring still to FIG. 1, instruction buses P1, P2 couple together the corresponding processor core 11, 21, the local DARAM 13, 23, the local ROM 12, 22, and the shared PRAM 132. Data buses D1, D2 couple together the corresponding processor core 11, 21, the local DARAM 13, 23, and the local SARAM 14, 24. Memory buses M1, M2 couple the memory bus multiplexer 16, 26 with each of the volatile memory devices 13, 14, 23, 24, 132 in the corresponding subsystem. The memory buses also couple to peripheral devices 15, 25.

Peripheral devices 15, 25 preferably each include one or more multi-channel, serial interfaces. The multi-channel serial interfaces provide high-speed, full-duplex, double-buffered serial communications. The configuration of these ports is preferably programmable by the associated processor core to allow direct interfacing with existing serial protocols. Each serial interface 15, 25 preferably supports multi-channel transmit and receive of up to 128 channels. The multi-channel serial ports perform time division multiplexing and de-multiplexing when multiple channels are enabled. Each data frame that is sent or received represents a time-division multiplexed (TDM) data stream, so that the content of one channel is interleaved with the contents of the other channels.

Memory bus multiplexers 16, 26 and memory bus arbiters 17, 27 are each coupled to all DMA controllers 18, 28 and HPI units 19, 29. The local DMA controller 18, the local HPI unit 19, the remote DMA controller 28, and the remote HPI unit 29 can each control memory bus M1 via memory bus multiplexer 16 to access peripherals 15, SARAM 14, DARAM 13, and PRAM 132. Similarly, each of them can control memory bus M2 via memory bus multiplexer 26 to access peripherals 25, SARAM 24, DARAM 23, and PRAM 132. Accordingly, each of the DMA controllers has global access, as does each of the HPI units. Arbitration among the local DMA controller, the local HPI unit, and the remote subsystem for access to memory bus M1 is performed by arbiter 17, which then sets the memory bus multiplexer 16 in accordance with the arbitration winner. Multiplexer 26 and arbiter 27 operate similarly for accesses via memory bus M2.

Each DMA controller 18, 28 moves data and instructions to and from local peripherals and data storage devices, and to shared PRAM 132, via the corresponding memory bus M1, M2. Each DMA controller 18, 28 can also move data to and from remote peripherals and data storage devices via the remote memory bus. Finally, each DMA controller can move data to and from external sources via an external I/O bus XD1, XD2 and the XPORT. Although the transfers may be initiated in different ways, including initiation by the processor core, the transfers are thereafter performed "in the background", i.e., without active monitoring and control by the processor core. Each DMA controller preferably provides multiple "channels"for the independent, concurrent management of multiple block transfers. DMA transfers are accomplished by first reading the data into memory internal to the DMA controller, and then writing the data from the DMA controller memory to the desired destination. When processor core memory accesses to internal memory conflict with DMA controller accesses, the DMA controller accesses are preferably given higher priority.

The HPI units 19, 29 allow an external host processor to access all internal memory via the memory buses M1, M2. To keep the overall system design simple, the host processor interfaces 19, 29 are designed to mimic a memory interface. That is, the host processor can "view"the contents of any memory location internal to the DSP device 100 and many of the processor core registers by sending an address to the HPI units 19, 29 indicating the desired location. One of the HPI units 19, 29 then retrieves the desired information and provides the information as data in the same way that a memory device would. The HPI units 19, 29 can similarly store data in the desired location. The software to be executed by the processor cores may be provided by the host processor in this manner. That is, the host processor may write the software to shared PRAM 132 via the HPI 19, 29. The HPI units 19, 29 preferably act as a slave device to the host processor, but may generate a signal to the host processor to stall the host processor during an access if the memory buses M1, M2 are busy with other tasks.

Figure 2:
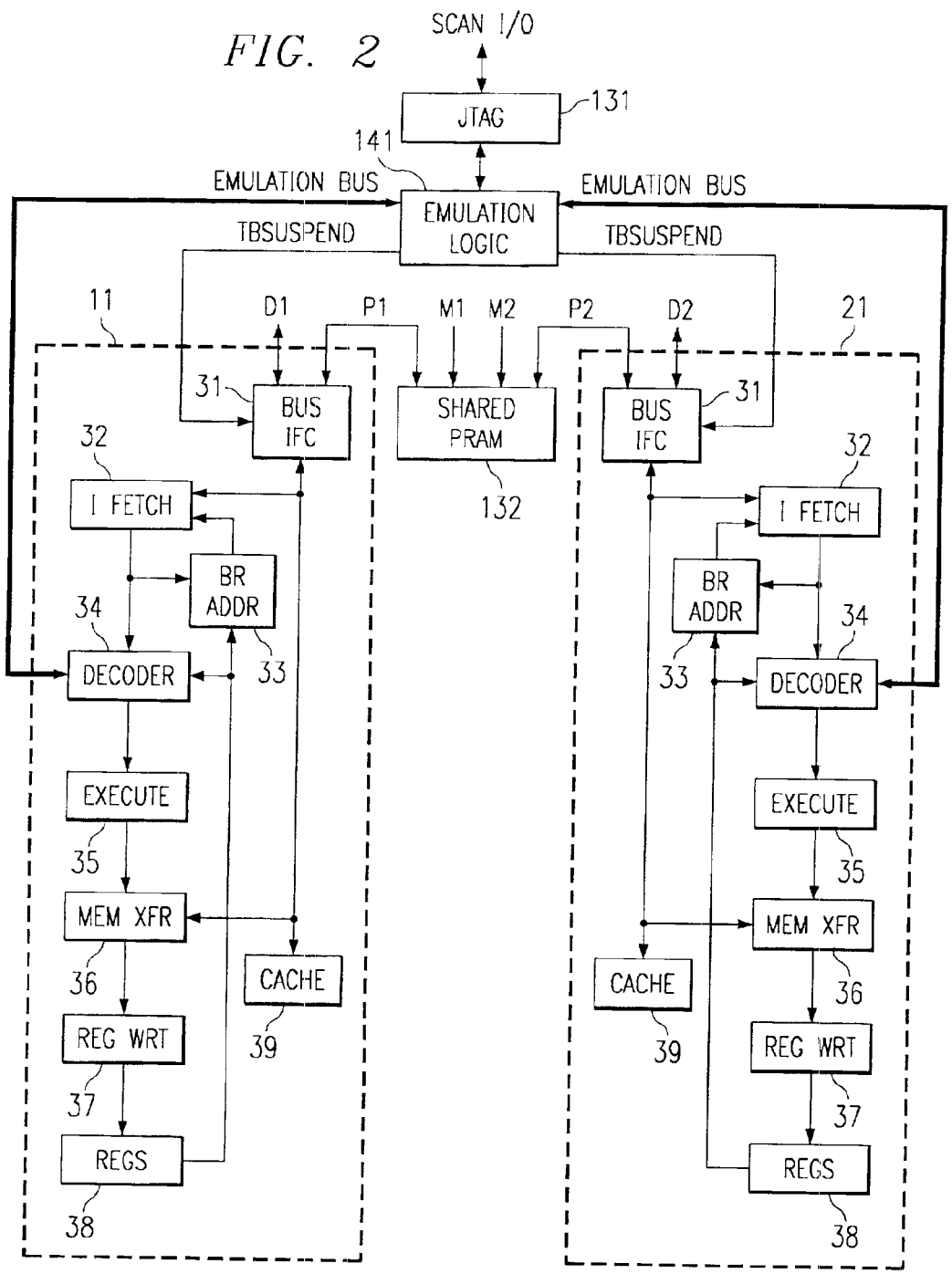
FIG. 2 shows a preferred method for coupling multiple processor cores to the shared program memory and to the emulation logic.

Referring now to FIG. 2, processor cores 11, 21 may each include identical modules. In a preferred embodiment, processor core 11 includes a bus interface module 31, an instruction fetch module 32, a branch address generator module 33, an instruction decoder module 34, an execution module 35, a memory transfer module 36, a register write module 37, a register module 38, and a cache module 39. The bus interface module 31 performs instruction and data transfers to and from the memory devices 12, 13, 14, 132 via instruction bus P1 and data bus D1. The bus interface module 31 is coupled to the instruction fetch module 32 to provide instructions, to the memory transfer module 36 to provide data, and to the cache 39 for temporary storage.

Modules 32–38 form a pipeline structure in which each stage performs a portion of the instruction execution process. Instruction fetch module 32 performs "pre-fetching" of the instructions to minimize any delays that may be incurred by the retrieving of instructions over the instruction bus. That is, while the other stages of the pipeline are carrying out the current instructions, the instruction fetch module 32 fetches the next instruction to be executed by the pipeline.

Branch address generator module 33 generates the address of the next instruction to be fetched by module 32. In addition to the standard, instruction pointer register increment circuit, branch address generator module 33 preferably includes a branch instruction detection circuit and a branch prediction circuit. The branch instruction detection circuit monitors the instructions fetched by the instruction fetch module 32, and detects when the fetched instruction is a branch instruction. The branch prediction circuit attempts to predict whether or not a conditional branch instruction will trigger a branch or not. If the branch address generator module 33 detects an unconditional branch or predicts that a conditional branch will occur, the branch address generator causes the instruction fetch module 32 to jump to the destination instruction. Otherwise, the branch address generator module 33 has the instruction fetch module 32 simply fetch the subsequent instruction.

Instruction decoder module 34 translates the instruction "opcodes" into hardware signals that will activate the proper portions of execution module 35 and provide those portions with the operand values. The operand values may be literal values retrieved with the instructions, or they may be register values stored in one of the registers 38.

Execution module 35 includes hardware for performing arithmetic and logical operations in accordance with signals and operands received from decoder module 34. Such operations may include, for example, addition, subtraction, multiplication, inversion, logical AND, logical OR, logical XOR, and logical NOT. Preferably, the execution module includes hardware capable of both fixed point and floating point operations.

The results from the execution module 35 are received by memory transfer module 36. The memory transfer module 36 can send the results to bus interface module 31 for storage in memory, or it can provide the results to register write module 37 for storage in registers 38. In addition, the memory transfer module 36 can use the results as an address from which to retrieve data from memory. In that case, memory transfer module 36 can perform a read operation of memory via bus interface 31, and provide the read data to register write module 37.

Register write module 37 operates to store information in registers 38. As mentioned previously, the instructions fetched by module 32 may be retrieved on the basis of a branch prediction, and inevitably some predictions will be erroneous. Hence it may be inappropriate to update the registers 38 on the basis of those executed instructions. Accordingly, register write module 37 determines if the registers 38 should be updated before performing the write operations. If the decoder 34 and execution unit 35 support out-of-order instruction execution, the write module 37 may perform re-ordering of the write operations if it is necessary to secure the correct sequence of register updates. Register module 38 is simply a set of processor registers used for storing intermediate operation values.

Cache 39 cooperates with bus interface 31 to service requests for instructions from instruction fetch module 32, and preferably also requests for data from memory transfer module 36. When a cache miss occurs, the bus interface 31 retrieves the desired information and information from adjacent memory locations. The additional information is temporarily stored by the cache 39 because there exists a significant probability that the additional information will subsequently be requested. If that additional information is then requested (a cache hit), the request can be serviced in less time than would otherwise be necessary.

The above-described processor structure is given for explanatory purposes, and is in no way limiting. Functional verification of DSP device 100 and debugging of software executed by the device is made easier by inclusion of a test port 131 and emulation logic 141. Test port 131 preferably complies with the Joint Test Access Group (JTAG) specification, and accordingly, preferably provides serial access to multiple scan chains distributed around the boundary of the device and throughout the modules of particular interest The scan chains capture the information of interest and allow the information to be serially transmitted off-chip. The scan chains may also be used to change the information of interest by serially receiving new values from off chip.

Various embodiments of emulation logic 141 and its interface with test port 131 are described in U.S. Pat. No. 5,535,331 and related patents, which are hereby incorporated herein by reference. Emulation logic 141 is coupled to the processors to monitor the execution of the software by the processors. In FIG. 2, the emulation logic is shown coupled to the decoder modules 34 to monitor the instructions and operand values given to the execution module 35. However, the emulation logic may additionally or alternatively be coupled to the branch address generation module 33 to monitor which program branches are taken, or to the register module 38 to monitor register values.

The monitoring may be performed by storing detected activity in a ring buffer in logic 141, which can then be accessed as a scan chain. The monitoring may also be performed by halting the processors when desired and retrieving scan chain values from modules of interest. In either case the emulation logic 141 may assert a signal TBSUSPEND to halt the processors while information is being retrieved. In FIG. 2, the TBSUSPEND signal is shown coupled directly to the bus interface, but may also be coupled to the clock distribution tree (not specifically shown) to halt the processor clock. Upon detecting an assertion of the TBSUSPEND signal the bus interface 31 preferably does not immediately halt, but rather, preferably completes any pending write transactions and then halts.

In addition to monitoring, the emulation logic 141 can actively perform functional testing. The emulation logic 141 may essentially write instructions directly into the decoder module 34. The instructions can be used to directly test the processor pipeline. To enable full "at-speed" testing, however, this direct writing is inadequate by itself. But it can be used indirectly by programming the decoder to write a set of test instructions to shared program memory 132, and then giving the processor an unconditional branch instruction to that set of instructions. The TBSUSPEND signal can then be de-asserted to allow the processor to run the test instructions at full speed.

Consequently, there is a condition under which it is desirable to allow the processor to write to shared program memory 132. Under normal conditions, however, such writing is preferably disabled. Accordingly, the read/write signals of the instruction buses P1, P2 are allowed to transfer a write signal preferably only when the processor is in emulation mode, that is, when the TBSUSPEND signal is asserted.

Figure 3:
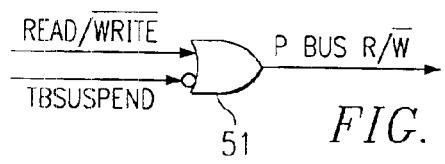
FIG. 3 shows an embodiment of the conditional write protection logic.

To this end, FIG. 3 shows a logic gate 51 that is preferably included in the bus interface 31. The logic gate produces the read/write signal of the instruction bus in response to a requested read/write operation signal and in response to the TBSUSPEND signal. The preferred embodiment of the logic gate 51 is a logical OR gate, although other logic gates may alternatively be used. When the TBSUSPEND signal is de-asserted, that is, when the processors are operating in a normal mode, the output of logic gate 51 is held high. Accordingly, the read/write signal is maintained in a read state under this condition. When the TBSUSPEND signal is asserted, the read/write signal on the instruction bus will reflect the requested read/write operation signal.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A digital signal processing system that comprises:
a shared program memory;
a plurality of processor subsystems coupled to the shared program memory to concurrently access instructions stored by the shared program memory,
wherein the shared program memory is conditionally write-protected from at least one of the processor subsystems, wherein the processor subsystems are prevented from writing anything to the shared program memory while the processor subsystems are in a normal operating mode.

2. The system of claim 1, wherein the program memory and the plurality of processor subsystems are fabricated on a single chip.

3. The system of claim 1, wherein the processor subsystems are allowed to write information to the shared program memory to test the digital signal processing system while the processor subsystems are in an emulation mode.

4. The system of claim 1, wherein each of the plurality of processor subsystems includes:
a processor core; and
an instruction bus that couples the processor core to the shared program memory.

5. The system of claim 4, wherein each of said processor cores includes a bus interface module coupled to the associated instruction bus to access instructions stored by the shared program memory.

6. The system of claim 5, wherein the bus interface module is configured to allow the processor core to perform write operations to the shared program memory only when the processor core is operating in an emulation mode.

7. The system of claim 5, wherein the bus interface module is configured to prevent the processor core from writing anything to the shared program memory while the is in a normal operating mode.

8. The system of claim 7, wherein the bus interface module is further configured to allow the processor core to write information to the shared program memory while the processor is in an emulation mode.

9. The system of claim 8, wherein the bus interface receives a signal that, when asserted, indicates that the processor core is in an emulation mode.

10. The system of claim 9, wherein de-assertion of said signal causes said bus interface module to maintain an instruction bus read/write signal in a read state, and wherein assertion of said signal causes said bus interface module to maintain the instruction bus read/write signal in accordance with shared program memory access operations requested by the processor core.

11. The system of claim 4, wherein the processor subsystems each further include:
data memory coupled to the processor core via a data bus distinct from the instruction bus, wherein the processor core is configured to operate on data from the data memory in accordance with program instruction retrieved via the instruction bus.

12. The system of claim 11, wherein the processor subsystems each further include:
a direct memory access (DMA) controller; and
a memory bus that couples the DMA controller to the data memory and the shared program memory, wherein the memory bus is distinct from the instruction bus and distinct from the data bus.

13. The system of claim 4, wherein the program memory is configured to service instruction requests received via the instruction buses in each clock cycle.

14. The system of claim 13, wherein the processor cores are configured to concurrently execute distinct instructions from a single program stored in the shared program memory, and wherein the order in which program instructions are executed by a processor core depends on the data that the processor core operates on.

15. A method of conditionally write protecting a shared program memory in a multi-core processor chip, wherein the method comprises:

receiving a requested shared program memory access operation from a processor core; and combining the requested shared program memory access operation with a signal indicative of a current operating mode to produce a communicated shared program memory access operation, wherein when the current operating mode is a normal operating mode, the communicated shared program memory access operation is prevented from being a write operation.

16. The method of claim 15, wherein when the current operating mode is an emulation mode, the communication shared program memory access operation is always the same as the requested shared program memory access operation.

17. The method of claim 16, wherein the emulation mode is indicated by the assertion of a suspend signal, and wherein said combining includes:

inverting the suspend signal; and performing a logical OR of the inverted suspend signal with a read/write signal included in the requested access operation to produce a read/write signal for inclusion in the communicated access operation.

18. A digital signal processor chip that comprises:

a volatile memory containing software instructions; and a plurality of processor cores coupled to the volatile memory via a corresponding plurality of instruction buses, wherein the processor cores are configured to retrieve and execute instructions from the volatile memory, and wherein each of the instruction buses is configured to convey only read operations to the volatile memory while their corresponding processor cores are in a normal operating mode, wherein each of the instruction buses includes a read/write signal line that is maintained in a read state while the corresponding processor cores are in the normal operating mode.

19. The chip of claim 18, wherein each of the instruction buses is configured to allow both read operations and write operations to be conveyed to the volatile memory while the corresponding processor cores are in an emulation mode.

20. The chip of claim 19, wherein each of the instruction buses includes a read/write signal line having a value produced by a logic gate that combines a read/write signal value from the corresponding processor core with an operating mode signal value for the corresponding processor core.

21. The chip of claim 20, wherein the operating mode signal acts as a gate control signal that prevents the read/write signal from the corresponding processor core from affecting the read/write signal on the instruction bus.

22. The chip of claim 20, further comprising:

a test port; and emulation logic that determines the operating mode signals for each of the processor cores in response to control information received via the test port.

* * * * *